United States Patent
Van Der Wal et al.

(10) Patent No.: US 10,399,872 B2
(45) Date of Patent: Sep. 3, 2019

(54) APPARATUS AND METHOD FOR REMOVAL OF IONS

(71) Applicant: VOLTEA B.V., Sassenheim (NL)

(72) Inventors: Albert Van Der Wal, Oegstgeest (NL); Hank Robert Reinhoudt, Wassenaar (NL); Bart Van Limpt, Leiden (NL); Thomas Richard Bednar, Brookfield, WI (US); George Shoemaker Ellis, Brookfield, WI (US); David Jeffrey Averbeck, Brookfield, WI (US)

(73) Assignee: VOLTEA B.V., Sassenheim (NL)

( * ) Notice: Subject to any disclaimer, the term of this patent is extended or adjusted under 35 U.S.C. 154(b) by 505 days.

(21) Appl. No.: 14/351,857

(22) PCT Filed: Oct. 12, 2012

(86) PCT No.: PCT/NL2012/050716
§ 371 (c)(1),
(2) Date: Apr. 14, 2014

(87) PCT Pub. No.: WO2013/055220
PCT Pub. Date: Apr. 18, 2013

(65) Prior Publication Data
US 2014/0238862 A1      Aug. 28, 2014

(30) Foreign Application Priority Data
Oct. 14, 2011   (NL) ...................................... 2007598

(51) Int. Cl.
C02F 1/469       (2006.01)
C02F 103/08      (2006.01)

(52) U.S. Cl.
CPC ........ *C02F 1/4691* (2013.01); *C02F 2103/08* (2013.01); *Y10T 29/49117* (2015.01)

(58) Field of Classification Search
CPC .......................... C02F 1/4691; C25B 9/18–206
See application file for complete search history.

(56) References Cited

U.S. PATENT DOCUMENTS

| | | | | | |
|---|---|---|---|---|---|
| 4,671,863 A | * | 6/1987 | Tejeda | ................... | B01D 61/46 204/266 |
| 5,094,739 A | * | 3/1992 | Kump | .................... | C02F 1/385 204/248 |

(Continued)

FOREIGN PATENT DOCUMENTS

CN      101331088 A      12/2008
EP      1 164 110          12/2001
(Continued)

OTHER PUBLICATIONS

Oren, Y., "Capacitive deionization (CDI) for desalination and water treatment—past, present and future (a review)," Desalination, vol. 228, No. 1-3, 2008, pp. 10-29.
(Continued)

*Primary Examiner* — Bryan D. Ripa
*Assistant Examiner* — Ho-Sung Chung
(74) *Attorney, Agent, or Firm* — Pillsbury Winthrop Shaw Pittman LLP

(57) ABSTRACT

An apparatus to remove ions including a plurality of capacitive electrode stacks. Each capacitive electrode stack may have: a plurality of first electrodes including a plurality of first current collectors; a plurality of second electrodes including a plurality of second current collectors; and a spacer between the first and second electrodes to allow water to flow in between the electrodes. The second current collectors of a first of the plurality of capacitive electrode stacks may be connected to the first current collectors of a second of the plurality of capacitive electrode stacks.

21 Claims, 8 Drawing Sheets

(56) References Cited

U.S. PATENT DOCUMENTS

| | | | |
|---|---|---|---|
| 5,584,981 A | 12/1996 | Turner | |
| 6,628,505 B1* | 9/2003 | Andelman | C02F 1/4691 361/302 |
| 2002/0185446 A1* | 12/2002 | Johnny | C02F 1/463 210/709 |
| 2004/0074768 A1* | 4/2004 | Anex | F04B 17/00 204/294 |
| 2005/0079409 A1* | 4/2005 | Andelman | C02F 1/46109 429/94 |
| 2007/0007145 A1* | 1/2007 | Simmons | C02F 1/4672 205/357 |
| 2007/0095670 A1* | 5/2007 | McLachlan | C02F 1/48 204/551 |
| 2008/0105551 A1 | 5/2008 | Wang | |
| 2008/0198531 A1* | 8/2008 | Shiue | C02F 1/46104 361/434 |
| 2010/0059378 A1* | 3/2010 | Elson | C02F 1/4691 204/520 |
| 2011/0042205 A1 | 2/2011 | Kim | |
| 2011/0042206 A1* | 2/2011 | Tanahashi | C02F 1/4602 204/278.5 |
| 2011/0147212 A1 | 6/2011 | Kim | |
| 2011/0240474 A1 | 10/2011 | Seed | |
| 2012/0199486 A1* | 8/2012 | Kang | C02F 1/46109 204/630 |

FOREIGN PATENT DOCUMENTS

| | | | | |
|---|---|---|---|---|
| EP | 2 253 593 | | 11/2010 | |
| EP | 2 322 486 | | 5/2011 | |
| EP | 2 338 843 | | 6/2011 | |
| WO | WO 00/14304 | | 3/2000 | |
| WO | WO 01/13389 | | 2/2001 | |
| WO | WO 2007/070594 A2 | | 6/2007 | |
| WO | WO 2010/069065 | | 6/2010 | |
| WO | WO 2011043604 A1 * | | 4/2011 | C25B 11/04 |
| WO | WO 2011/056070 A1 * | | 5/2011 | C02F 1/469 |
| WO | WO 2011/072400 | | 6/2011 | |

OTHER PUBLICATIONS

International Search Report and Written Opinion as issued for International Application No. PCT/NL2012/050716, dated Dec. 14, 2012.

Search Report and Written Opinion as issued for Netherlands Patent Application No. 2007598, dated Mar. 28, 2012.

* cited by examiner

APPARATUS AND METHOD FOR REMOVAL OF IONS

FIELD

An embodiment of the invention relates to an apparatus to remove ion comprising a plurality of capacitive electrode stacks, each electrode stack comprising:
a plurality of first electrodes comprising a plurality of first current collectors;
a plurality of second electrodes comprising a plurality of second current collectors; and
a spacer between the first and second electrodes to allow water to flow in between the electrodes.

BACKGROUND

In recent years one has become increasingly aware of the impact of human activities on the environment and the negative consequences this may have. Ways to reduce, reuse and recycle resources are becoming more important. In particular, clean water is becoming a scarce commodity. Therefore, various methods and devices for purifying water have been published.

A method for water purification is by capacitive deionisation, using an apparatus provided with a flow through capacitor (FTC) to remove ions in water. The FTC functions as an electrically regenerable cell for capacitive deionisation. By charging electrodes, ions are removed from an electrolyte and are held in electric double layers at the electrodes. The electrodes may be charged with a voltage between 0.5 to 2 Volts. The electrodes may be (partially) electrically regenerated to desorb such previously removed ions without adding chemicals.

The apparatus to remove comprises one or more pairs of spaced apart electrodes (a cathode and an anode) and a spacer, separating the electrodes and allowing water to flow between the electrodes. The electrodes are provided with current collectors or backing layers that are generally adjacent to or very near the electrodes and a material to store the ions. Current collectors are electrically conductive and transport charge in and out of the electrodes.

The apparatus may comprise a housing comprising an inlet to let water into the housing and an outlet to let water out of the housing. In the housing, the layers of electrodes and spacers are stacked in a "sandwich" fashion by compressive force, normally by mechanical fastening.

SUMMARY

A problem with the apparatus to remove ions is that the charging voltages may be low causing high electrical currents within the apparatus which may lead to increased energy loss or which may require the use of thick expensive metal connectors, or expensive power supplies that may handle high currents at low voltage.

It is an object to provide an improved apparatus to remove ions.

Accordingly, in an embodiment of the invention, there is provided an apparatus to remove ions comprising a plurality of capacitive electrode stacks, each capacitive electrode stack comprising:
a plurality of first electrodes comprising a plurality of first current collectors;
a plurality of second electrodes comprising a plurality of second current collectors; and
a spacer between the first and second electrodes to allow water to flow in between the electrodes,
wherein the plurality of second current collectors of a first of the plurality of capacitive electrode stacks are electrically connected to the plurality of first current collectors of a second of the plurality of capacitive electrode stacks.

By connecting the plurality of second current collectors of a first of the plurality of capacitive electrode stacks electrically to the plurality of first current collectors of a second of the plurality of capacitive electrode stacks, the electrical currents in the current collectors of a first of the plurality of capacitive electrode stacks may be substantially the same as the electrical currents in the current collectors of a second of the plurality of capacitive electrode stacks, whereas the applied voltages will be divided over the plurality of current collectors of the first and second of the plurality of capacitive electrode stacks. This allows for an operation of the apparatus to remove ions at higher voltages, whereby the electrical currents may be kept relatively low.

The plurality of second current collectors of the second of the plurality of capacitive electrode stacks may be electrically connected to the plurality of first current collectors of a third of the plurality of capacitive electrode stacks.

The apparatus may comprise a housing, an inlet to let water enter an interior of the housing, and an outlet to let water out of the interior of the housing, and the plurality of second current collectors of the first of the plurality of capacitive electrode stacks, which are electrically connected to the plurality of first current collectors of the second of the plurality of capacitive electrode stacks within the same housing.

The plurality of first and second current collectors may be directly electrically connected by pressing them against each other.

The apparatus may comprise a clamp to press the plurality of current collectors against each other to electrically connect the plurality of first and second current collectors.

The clamp may be of a non-metal material. The current collectors may be metal free. The current collectors may comprise carbon, such as e.g. graphite to conduct an electrical charge.

The apparatus may comprise a first power connector to connect the plurality of first current collectors of the first stack with a power supply.

The apparatus may comprise a second power connector to connect the plurality of second current collectors of the last of the plurality of stacks with a power supply.

The power connector may be connected in series with the plurality of first current collectors of the first of the plurality of capacitive electrode stacks and with the plurality of second current collectors of a last of the plurality of capacitive electrode stacks.

The power connector may be provided with a metal and a carbon portion.

The apparatus may comprise a power connector clamp configured to press the current collectors against the carbon portion of the power connector.

The apparatus may comprise an insulator between each capacitive electrode stack in order to electrically insulate the stacks from each other. The insulator may comprise a tray configured to hold the stack.

The apparatus may comprise a second insulator substantially surrounding the current collectors so as to electrically insulate the current collectors.

The first current collectors of the plurality of first current collectors of the individual stacks may be electrically connected with each other in parallel.

The first current collectors of the plurality of first current collectors may be electrically connected by clamping them together.

The apparatus may comprise a housing, an inlet to let water enter an interior of the housing, and an outlet to let water out of the interior of the housing, wherein the power connector provides an electrical connection between the current collectors and the power source outside of the housing.

The second current collectors of the first of the plurality of capacitive electrode stacks may be directly electrically connected to the first current collectors of the second of the plurality of capacitive stacks.

The plurality of current collectors within the electrode stack may be electrically connected in parallel.

According to a further embodiment of the invention, there is provided an apparatus to remove ions comprising a plurality of electrode stacks, each electrode stack comprising:
 a plurality of first electrodes comprising a plurality of first current collectors;
 a plurality of second electrodes comprising a plurality of second current collectors;
 a spacer between the first and second electrodes to allow water to flow in between the electrodes; and
 a power connector configured to connect a power source to the plurality of capacitive electrode stacks in electrical serial connection with each other and the resistivity in each of the capacitive electrode stacks is substantially equal so as to divide the potential difference as applied by the power source substantially equally over all capacitive electrode stacks.

The apparatus may comprise a housing, an inlet to let water enter an interior of the housing, and an outlet to let water out of the interior of the housing, wherein the capacitive electrode stacks are serially connected within the housing.

The electrical current going through the second electrode of the first capacitive electrode stack may be equal to the electrical current going into the first electrode of the second capacitive electrode stack.

The capacitive electrode stacks that are in electrical serial connection with each other may be placed in the same housing The plurality of second current collectors of the first of the plurality of capacitive electrode stacks may be directly connected to the plurality of first current collectors of the second of the plurality of capacitive electrode stacks.

The apparatus may comprise a pressure device to provide compression of the stacks such that the pressure on each of the stacks is equal.

According to yet a further embodiment, there is provided a method of manufacturing an apparatus to remove ions, the method comprising:
 providing a plurality of capacitive electrode stacks, each capacitive electrode stack manufactured by:
  providing a plurality of first electrodes comprising a plurality of first current collectors,
  providing a plurality of second electrodes comprising a plurality of second current collectors, and
  providing a spacer between the first and second electrodes to allow water to flow in between the electrodes; and
 connecting the plurality of first current collectors of a first of the plurality of capacitive electrode stacks to the plurality of second current collectors of a second of the plurality of capacitive electrode stacks.

These and other aspects, features and advantages will become apparent to those of ordinary skill in the art from reading the following detailed description and the appended claims. For the avoidance of doubt, any feature of one aspect of the present invention may be utilised in any other aspect of the invention. It is noted that the examples given in the description below are intended to clarify the invention and are not intended to limit the invention to those examples per se. Similarly, all percentages are weight/weight percentages unless otherwise indicated. Numerical ranges expressed in the format "from x to y" are understood to include x and y. When for a specific feature multiple ranges are described in the format "from x to y", it is understood that all ranges combining the different endpoints are also contemplated.

BRIEF DESCRIPTION OF THE FIGURES

Embodiments of the invention will be described, by way of example only, with reference to the accompanying schematic drawings in which corresponding reference symbols indicate corresponding parts, and in which.

DETAILED DESCRIPTION

Figure 1:
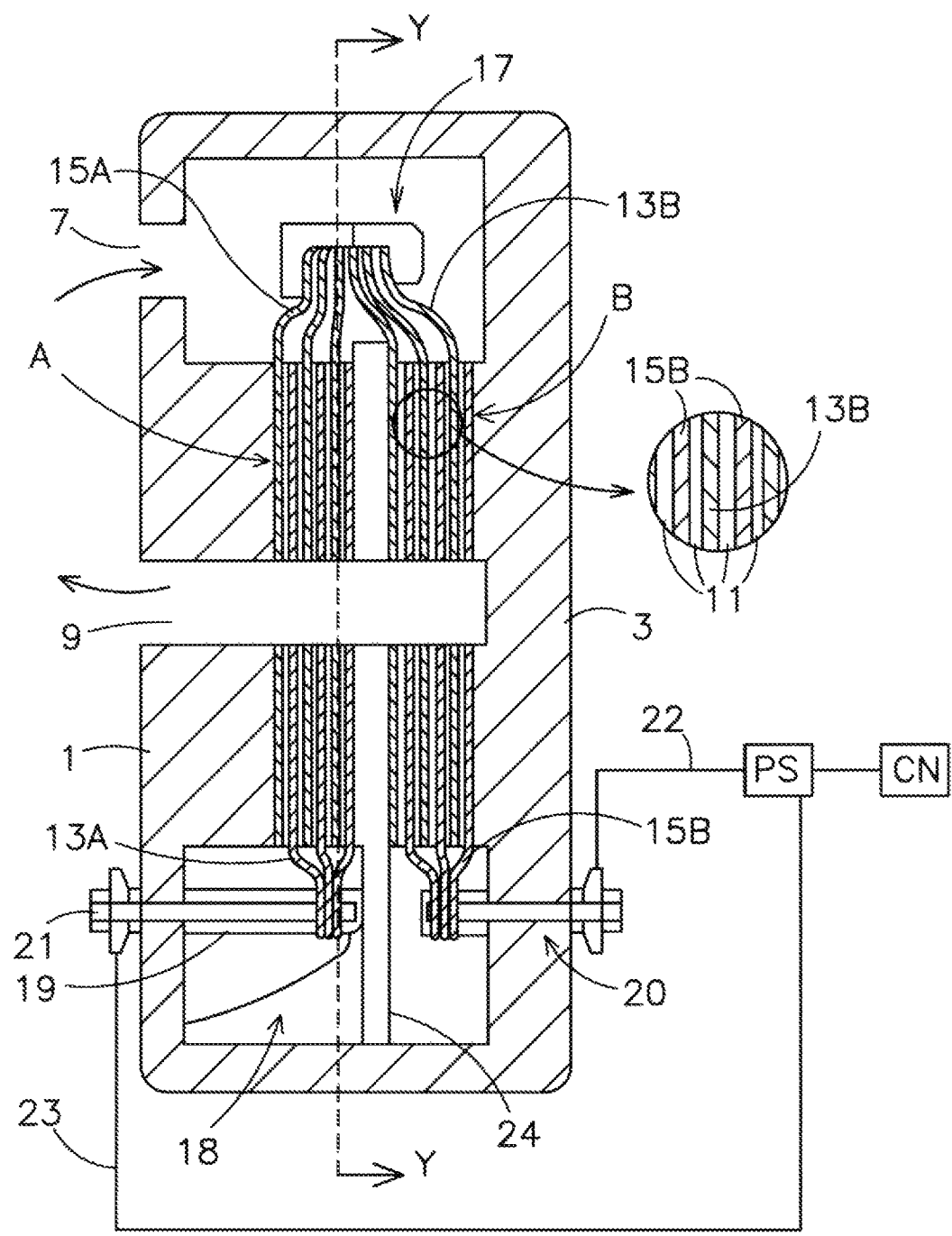
FIG. 1 shows a schematic cross-section of an apparatus to remove ions according to an embodiment.

FIG. 1 shows a schematic cross-section of an apparatus to remove ions from water according to an embodiment, which comprises two capacitive electrode stacks of first electrodes 13 and second electrodes 15 separated by spacers 11. The apparatus may have a housing comprising a first housing part 1 and a second housing part 3 made of a relatively hard material e.g. a hard plastic. By pressing the first and second housing parts onto each other, for example with a bolt and nut (not shown) the housing may be made water tight. Adhesive, seals or O-rings may be used to improve the water tightness of the housing.

The housing is provided with an inlet 7 and an outlet 9. During ion removal from the water, the water will flow from the inlet 7 to the outlet 9 through the spacers 11 which separate the first and second electrodes from each other. In the example the current collectors of the electrodes of two different stacks are clamped together inside the housing. In principle the current collectors can be clamped either inside or outside the housing. Nevertheless, clamping the current collectors inside the housing may have an advantage that stacks can be placed electrically in series without the need to make holes in the housing, which helps to provide a water leakage free apparatus. By creating an electrical potential difference between the first and second electrodes, for example by applying a positive voltage to the first electrode (the anode) 13 and a negative voltage to the second electrode (cathode) 15, anions in the water flowing through the spacer 11 are attracted to the first electrode and cations are attracted to the second electrode. In this way the ions (anions and cations) can be removed from the water flowing through the spacer 11. The electrical potential difference can also be created by e.g. applying a positive voltage to the first electrode (the anode) 13 and a lower positive voltage to the second electrode (cathode) 15. Also in this way the ions (anions and cations) can be removed from the water flowing through the spacer 11. In the example of FIG. 1 the two capacitive electrode stacks are electrically placed in series, whereas the flow paths, which are determined by the spacers 11 are placed parallel, which means that the water may flow from the inlet 7 to the outlet 9 via any of the flow path of either the first or the second stack, which is placed in the same housing.

The electrical potential differences between the first and second electrodes of the first capacitive electrode stack may be rather low, for example lower than 2 volts, lower than 1.7 volts or lower than 1.4 volts. An advantage of placing FTC stacks electrically in series is that the potential difference over multiple capacitive electrode stacks may be higher than that between the first and the second electrodes. For example, the potential difference over two capacitive electrode stacks A and B, provided with first and second electrodes 13A, 13B, 15A, 15B and a spacer 11, which are electrically connected in series may be twice as high than the potential difference over one single capacitive electrode stack or two capacitive electrode stacks A and B which are placed in a parallel electrical circuit. The current collectors of the first electrode 13A of a first capacitive electrode stack may be connected to an electrical power source PS for example and the current collector of the second electrode 15A of the first capacitive electrode stack may be connected to the current collector of the first electrode 13B of the second capacitive electrode stack. The connection may be directly, and may, for example, be accomplished by clamp 17, which may be made from a non-electrically conductive material since its function is to press the conductive current collectors of the second and first electrode 15A, 13B together so that the current is directly transported between the two current collectors. Alternatively clamp 17 may be made from an electrically conductive material or may contain parts that are electrically conductive. The second electrode 15A of a first capacitive electrode stack may substantially have the same potential as the first electrode 13B of the second capacitive electrode stack. The current collectors of the second electrode 15B may also be connected to the electrical power source PS in order to complete the electrical circuit.

The current collectors of the first electrode 13A are clamped between clamp portions 19. The clamp portions 19 may be made from plastic, but could also be made from carbon, for example graphite blocks. The clamp portions 19 may be provided with a ratchet mechanism to secure the clamp portions 19 with respect to each other and to optimize the contact surface between the current collector 13A and the clamp portions 19 to optimize electrical conductivity. To make the first connector, two clamp portions 19 may be pressed against multiple current collectors of the first electrode 13A so as to press the current collectors together and provide an electrical connection. Subsequently, an adhesive may be used to permanently fix the clamp portions 19 with the current collectors in a watertight manner. Alternatively, a screw 21 may be used to press the current collectors 13 together with the clamp portions 19 and at the same time avoiding water metal contact of the connector. For a low electrical resistance it is advantageous to make the contact surface of the current collector and the connector of the same or similar material, for example carbon. An advantage of carbon is that it does not corrode in the water and that it is relatively cheap compared to other non-corrosive materials and metals.

The pressure to clamp the current collector onto the connector may be at least 0.1 bar, at least 0.5 bar and less than 15 bar, less than 10 bar or less than 5 bar. The connector 18 may be glued against the housing so as to avoid contact of the water in the housing with the screw 21 which may be made out of metal. In this way corrosion of the screw may be prevented. In a similar way the current collector of the second electrode 15B of the second stack may be connected to the power source PS with a second connector 20. The potential difference delivered by the power source PS between the current collectors of the first electrode 13A of the first capacitive electrode stack via first cable 23 and the current collector of the second electrode 15B of the second capacitive electrode stack via second cable 22 may be, for example lower than 4 volts, lower than 3.4 volts or lower than 2.8 volts.

A potential problem of the relatively high potential difference between the first and second connectors, 18, 20 may be a potential leak current between the first and the second connectors. This may be prevented by placing an insulator between the two connectors. This insulator 24 may also be placed between the two connectors as well as the first and second stack. The insulator 24 may be an insulator to prevent electrical and/or ionic transport. By placing the capacitive electrode stacks electrically in series, the applied potential difference between the first and second connectors 18, 20 may be increased or even doubled, whereas at the same time the current through the cables 22, 23 may be reduced by as much as 50%. The energy efficiency of the FTC apparatus may therefore be improved and the need for very thick expensive cables may be reduced. At the same time a cheaper power source PS may be used that transports less current at higher voltage.

By assuring that the electrical resistance of the first and second capacitive electrode stacks A and B are substantially the same, the potential difference as delivered by the PS may be equally divided over the first and second capacitive electrode stacks A, B. As a consequence the potential difference between the first electrode 13A and the second electrode 15A of the first capacitive electrode stack A may be substantially the same as the potential difference between the first electrode 13B and the second electrode 15B of the second capacitive electrode stack B. This potential difference may for example be lower than 2 volts, lower than 1.7 volts or lower than 1.4 volts.

A feed through or opening may be provided through the housing at a position where the first and second connectors 18, 20 are positioned against the housing 1,3. The feed through may be provided with a metal screw 21 on which the cable 23 may be connected to the electrical power source PS. The power source PS may be controlled by controller CN to control the operation of the apparatus to remove ions.

The electrodes may be made substantially metal free to keep them corrosion free in the wet interior of the housing and at the same time cheap enough for mass production. The electrodes may be produced from a current collector 13A, B, 15A, B provided with a substantially metal free electrically conductive high surface area layer, which may contain activated carbon, carbon nanotubes, carbon aerogel, carbon black and/or graphene on both sides which are in contact with the water. The high surface area layer may be provided as a coating onto the current collector or as a separate film. A high surface area layer is a layer with a high surface area in square meters per weight of layer material e.g., >500 $m^2/gr$.

If the electrodes are saturated with ions the electrodes may be regenerated by reducing or even reversing the potential difference and discharging the electrical charge on the electrodes. This may result in the release of ions from the electrodes into the water flowing through the spacer. The increased ion content in the water in the spacer can be flushed out of the spacer. Once most ions are released from the electrodes and the water with increased ion content is flushed out of the spacer the electrodes are regenerated and can be used again for attracting ions.

Figure 2:
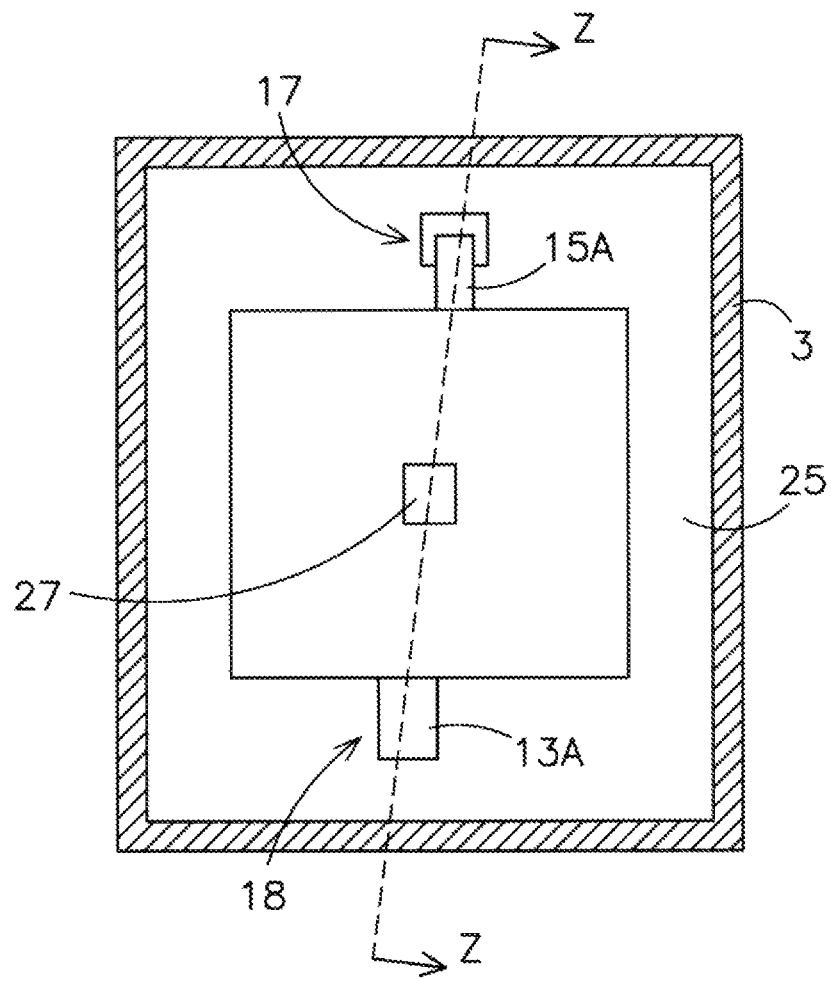
FIG. 2 shows a schematic cross-section along the line Y-Y of the apparatus of FIG. 1.

FIG. 2 discloses the cross-section along line Y-Y of the apparatus of FIG. 1. It shows the clamp 17 clamping the current collectors of the first and second electrode 15A and 13B (see FIG. 1). The housing is provided with a space 25 to allow water to flow around the electrodes and the spacers 11 and a second passage 27 to allow water to collect from all the spacers 11 and flow through the outlet 9 (of FIG. 1). The connector 18 to connect the current collector of the first electrode 13A is also shown. FIG. 1 is a cross section along the line Z-Z of FIG. 2.

Figure 3:
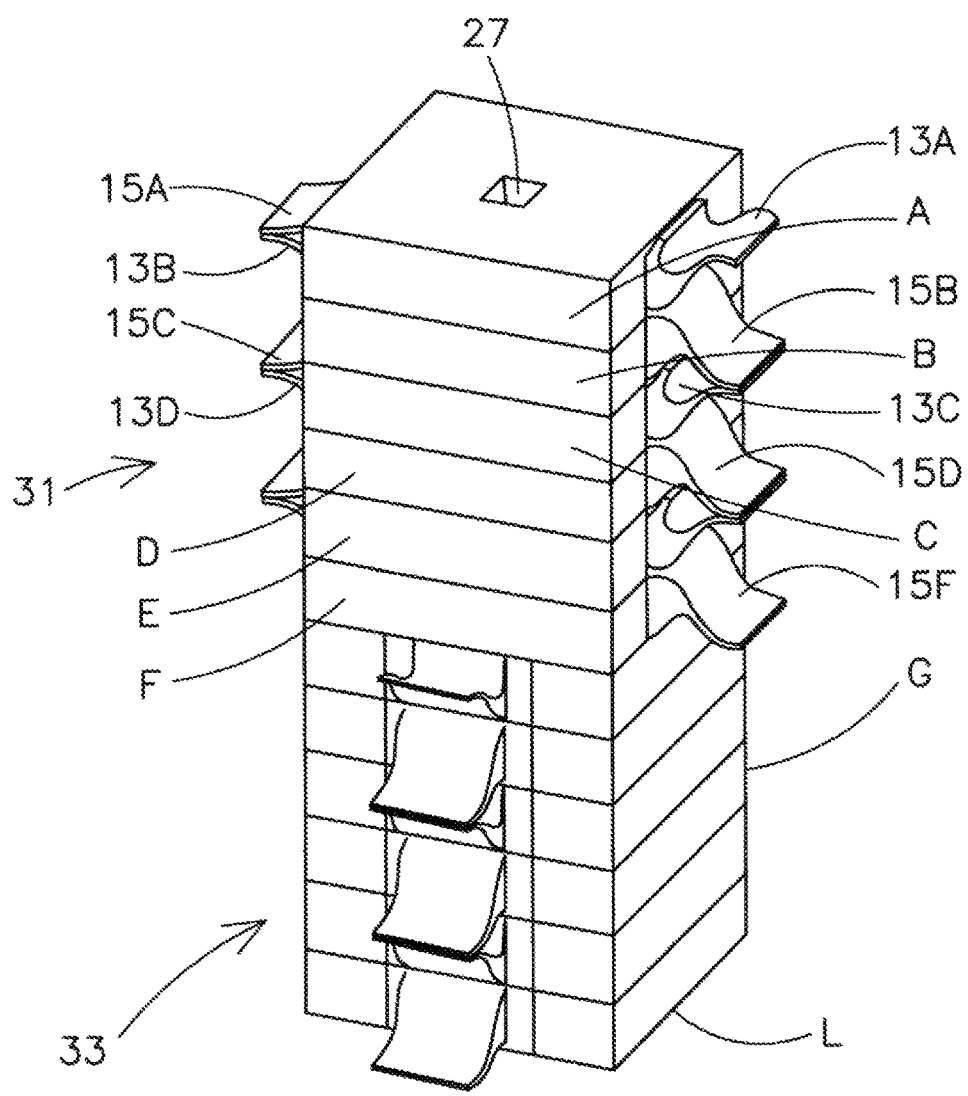
FIG. 3 shows a schematic three dimensional figure of an apparatus to remove ions according to a further embodiment.

FIG. 3 shows a schematic three dimensional figure of an apparatus to remove ions according to a further embodiment with 12 capacitive electrode stacks A, B, C, D . . . Each capacitive electrode stack A, B, C, D . . . comprises a first electrode 13A, 13B, 13C, 13D, . . . and a second electrode 15A, 15B, 15C, 15D, . . . . The capacitive electrode stacks are provided with an opening 27 to allow water to enter or exit the capacitive electrode stacks. A first group 31 of capacitive electrode stacks A . . . F is connected in series and a second group 33 of capacitive electrode stacks G . . . L is also connected in series. The potential difference that may be applied between the first electrode 13A of the first capacitive electrode stack A and the second electrode 15F of the last capacitive electrode stack F of the first group may be 6 times the potential difference of a single capacitive electrode stack. The potential difference between the first electrode 13A of the first stack A and the second electrode 15F may therefore be for example lower than 12 volts, lower than 9.4 volts or lower than 8.4 volts. Clamps (not shown) may be used to press the current collector of a second electrode 15A to a current collector of a first electrode 13B.

Figure 4:
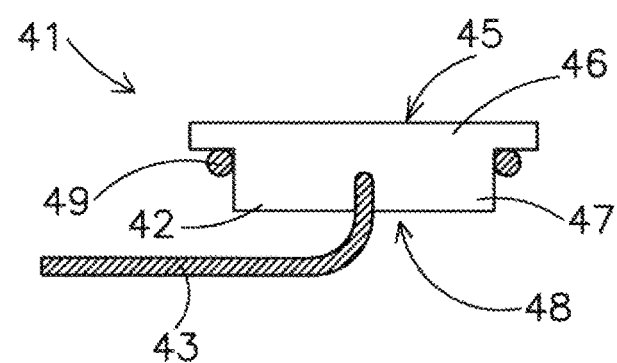
FIG. 4 schematically depicts a connector according to an embodiment.

FIG. 4 schematically depicts a connector according to an embodiment. The connector 41 may be used to connect a current collector of the apparatus to remove ions to a power source with a cable or lead 43. The connector 41 may be provided with a closing off portion or contact member 47 to be placed in the housing to close off an opening in the housing of the apparatus. The connector 41 may be provided with a connector surface or contact face 45 defined in a head 46 of a contact portion adjacent to the interior of the housing which may be pressed against the current collector to provide an electrical contact. The closing off portion or contact member 47 of the connector 41 may be provided with carbon such as graphite so as to avoid corrosion and to provide a good electrical contact with the carbon current collector of the electrodes. The connector 41 may comprise a flexible material or seal 49 to provide a watertight connection with the housing. The seal 49 may be an O-ring, for example made of rubber to provide a water tight connection with the housing. The cable or lead 43 may be provided in a connector portion having a neck 42 extending from the head in a direction away from the contact face and having a receptacle at a dry surface 48 of the connector portion so as to avoid corrosion of the cable or lead 43. The lead or cable 43 may be engaged with the neck of the connector portion and is capable of directing an electrical current to the contact member via the head. The contact portion is configured to engage with the stack so that the contact member is in electrical communication with the stack. The contact portion may be substantially cylindrical and may define the contact face 45. The perimeter of the contact face may form an arcuate rim. The contact portion may include a recess inward of the perimeter and a protrusion extending from the recess that terminates substantially coplanar with the rim. The contact face and the protrusion may be substantially cylindrical. The housing further may have a recess proximate to the opening, and the contact portion may be seated in the recess. The connector or contact member 47 is press fit or adhered to the opening. A seal portion may be defined by the head and/or neck such that the seal portion establishes a hydraulic seal between the seal portion and a mount into which the electrical connector is seated during operation.

Figure 5:
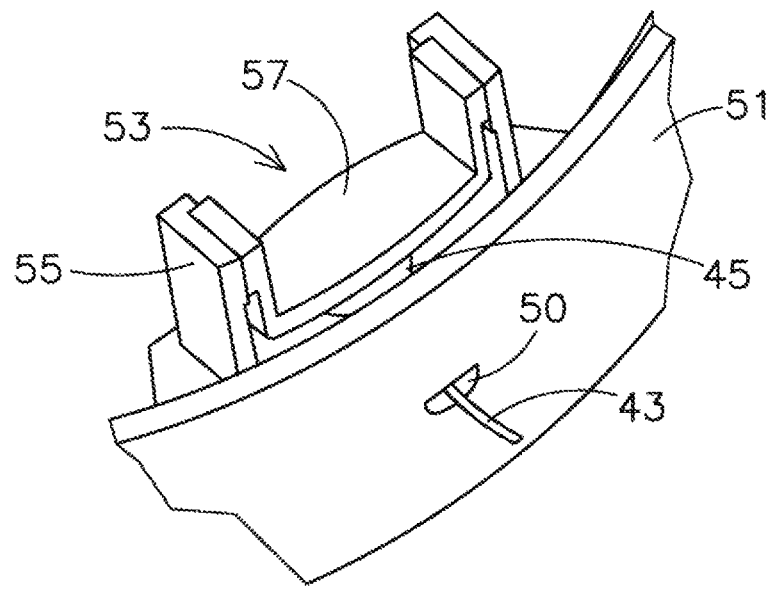
FIG. 5 schematically depicts the connector of FIG. 4 in a ring of a housing.
Figure 6:
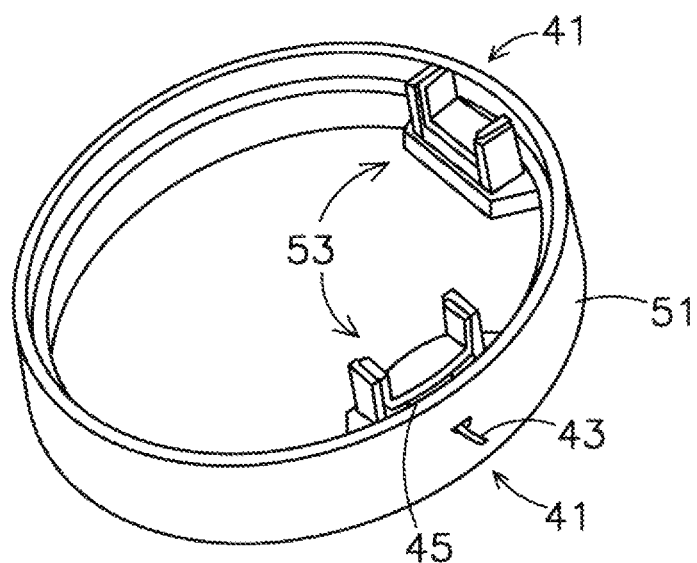
FIG. 6 schematically shows a full ring for the housing of an apparatus to remove ions with two connectors of FIG. 4.

FIG. 5 schematically depicts the connector of FIG. 4 provided in a ring 51 of the housing. The ring is provided with a connector clamp 53 to clamp the electrode against the surface 45 of the connector. The connector clamp 53 may comprise a fixed part or protrusion member 55 which extends from an interior surface of the housing and may comprise a pair of arms. The connector clamp 53 may be made from plastic. e.g. polyethylene, polypropylene or polyvinylchloride. By making the connector clamp 53 from plastic the connector clamp may press the plurality of current collectors onto the contact surface without being sensitive to corrosion. A non-plastic connector clamp may be sensitive to corrosion because there may be water surrounding the connector clamp as well as electrical currents. The connector clamp may also comprise a movable part or bridge 57 which is moveable along the pair of arms to adjust a pressure applied to the plurality of current collectors between the bridge 57 and the contact portion. Between fixed parts 55 and movable part 57 a ratchet mechanism may be provided. For example, the ratchet mechanism may comprise a surface with saw teeth which allows movement of the movable portion 55 in the direction of the connector but blocks movements of the movable portion 57 in opposite direction. The electrode may be provided in between the moveable portion 57 and the contact surface 45. By pressing the moveable portion 57 against the electrode and against the connector surface 45, a good connection will be provided between the electrode and the cable 43. FIG. 6 shows a full ring 51 for the housing with two connectors 41. The contact surface may define a contact face having a contact plane and the current collector of the electrode may be provided with an electrode plane which may be substantially parallel to the contact plane. The opening 50 provided in the ring 51 of the housing may define an elbow passage having a first portion extending substantially perpendicular to a longitudinal axis of the housing and a second portion extending substantially parallel to the longitudinal axis. The closing off portion or contact member 47 may be seated in the second portion.

Figure 7:
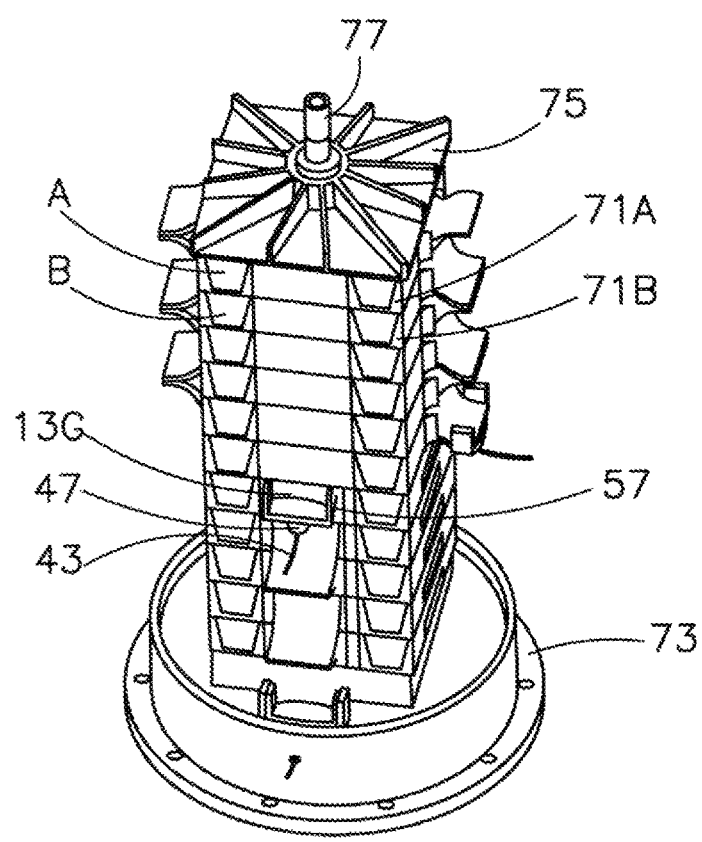
FIG. 7 schematically depicts the stack of FIG. 3 wherein stack A, B are provided in a tray.

FIG. 7 schematically depicts the capacitive electrode stack of FIG. 3 wherein capacitive electrode stack A, B are provided with a tray 71A, 71B. The tray 71A, 71B may improve manufacturability because it may protect the electrodes during assembling of the capacitive electrode stacks in the housing. During manufacturing of one capacitive electrode stack, the tray 71 may help in aligning the electrodes and/or the spacer. During use of the apparatus the tray may electrically and/or ionically insulate one capacitive electrode stack from another capacitive electrode stack and counteract leak currents.

The capacitive electrode stacks may be clamped between a bottom plate 73 and a pressure plate 75. A rod 77 may be provided through the opening 27 of the stacks and a nut may be provided which in cooperation with a thread on the rod may press the pressure plate 75 on the capacitive electrode stacks. Before pressing the pressure plate on the capacitive electrode stacks, water may be flushed through the spacer along the electrodes. Flushing the stacks with water may comprise flowing water through the stacks with a pressure of between 0.5 and 10 bar, between 1 and 5 bar or between 2 and 4 bar. Flushing helps to remove any loose material out of the spacer and/or the membranes and/or the electrodes before the pressure is applied and after flushing, the capacitive electrode stack will be compressed and the capacitive electrode stacks will be fixed in the housing. The capacitive electrode stacks may be fixated permanently. By exerting a force on the capacitive electrode stacks so as to compress the first and second electrodes and the spacer, the electrical resistivity may be decreased which may make the apparatus more efficient. It is important that the electrical resistivity is substantially equal for every capacitive electrode stack because otherwise the voltage is not equally divided over the individual capacitive electrode stacks. If one capacitive electrode stack operates at higher voltage than another capacitive electrode stack then the capacitive electrode stack which receives a higher voltage may become damaged due to oxidation and/or electrolysis. Therefore the pressure needs to be equally divided for all the capacitive electrode stacks. The stacks may be compressed with pressure of less than 5 bar, less than 2 bar, or between 1 bar and 0.5 bar.

The bottom plate 73 may form a part of the housing of the apparatus to remove ions. In FIG. 7 it is also shown how the electrode 13G may be provided in between the moveable portion 57 and the closing off portion 47 of the connector clamp 53 to be electrically connected to the cable 43. A contact member may be seated in the base member or bottom plate 73 to define a contact portion and a connector portion extends from the contact portion. A lead may be engaged with the connector portion and capable of directing an electrical current to the contact member. A protrusion member may be extending from the base member or bottom plate 73 adjacent to the contact member. A compression member (similar as the design of FIG. 5) may be configured to selectively engage the protrusion member at a plurality of positions relative to the contact member such that the compression member may be adjusted to compress a current collector of the electrode between the compression member and the contact member. The compression member may include a resilient arm having a first interlocking member and the protrusion member may include a second interlocking member. The first interlocking and second interlocking members are configured to selectively engage such that first interlocking member of the compression member may be restrained relative to the contact member by the second interlocking member of the protrusion member. The first interlocking member may define a plurality of ramps and the second interlocking member may define a plurality of inverse ramps. The plurality of ramps and the plurality of inverse ramps may engage to inhibit separation of the protrusion member and the compression member.

Figure 8:
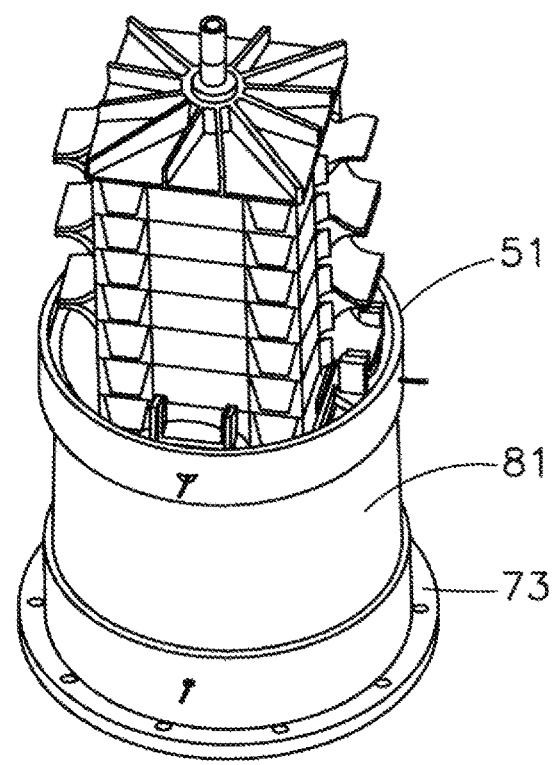
FIG. 8 schematically depicts the apparatus after a first housing portion and the ring of FIG. 5 are provided.

In FIG. 8 a first housing portion e.g., a round pipe section 81, is provided to the bottom plate 73 and the ring 51 of FIG. 6 is located on top of the section 81.

Figure 9:
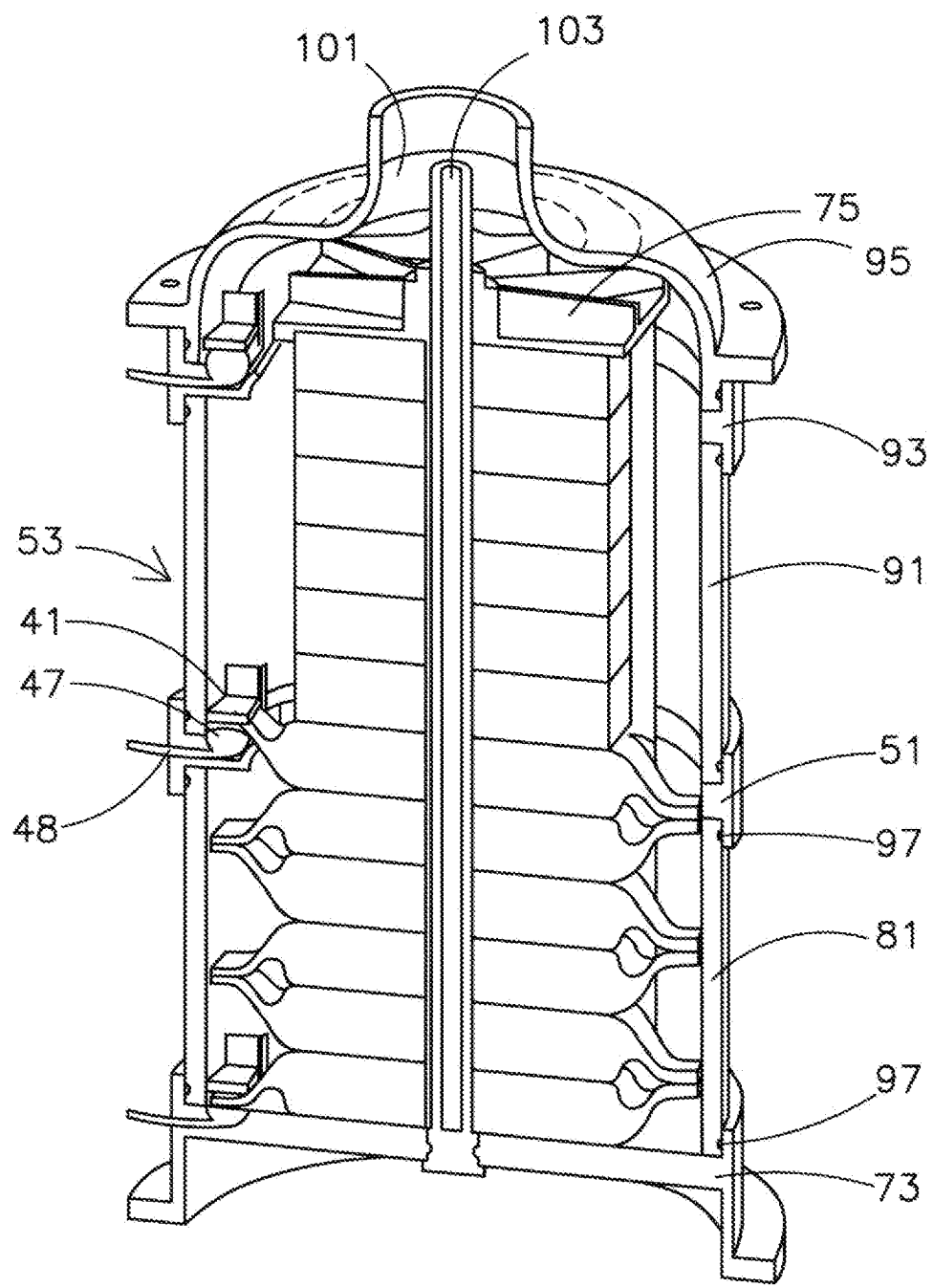
FIG. 9 schematically shows a cross section of the apparatus of FIGS. 3 to 7.

FIG. 9 schematically shows a cross section of the apparatus of FIGS. 3 to 7 after a second round pipe section 91 is provided on top of the ring 51, a second ring 93 is provided to the pipe section 91 and a top dome 95 is provided to the apparatus. The housing may be made water tight by providing flexible member 97, e.g., a rubber O-ring, in between the housing portion and the ring 51 or between the housing portion 81 and the bottom plate 73. The dome opening 101 in the top dome 95 allows for water intake for example from a water pipe whereas opening 103 may be used for the water outlet. The dome opening 101 may also be used for maintenance of the stacks. For example a socket wrench may be allowed access through the dome opening 101 to tighten a nut cooperating with a thread provided to the rod 77. By tightening the nut the capacitive electrode stacks may be compressed between the bottom plate 73 and the pressure plate 75. Before compressing the pressure plate on the capacitive electrode stacks, water may be flushed through the spacer along the electrodes. Flushing helps to remove any loose material out of the spacer and/or the membranes and/or the electrodes, after which the capacitive electrode stack will be compressed.

It is advantageous that the dome opening 101 in the top dome 95 allows for compressing the stack while the housing is filled with water. Also the dome opening 101 allows for the pressure to be adjusted at a later stage for example during installation of the apparatus or during maintenance. Further the connector 41 located in an opening 48 in the ring 51 is shown. The clamp 53 presses the current collector of an electrode onto the connector 41 and thereby presses the closing off body 47 in the opening 48, thereby closing off the opening 48 for water inside the housing.

Figure 10A:
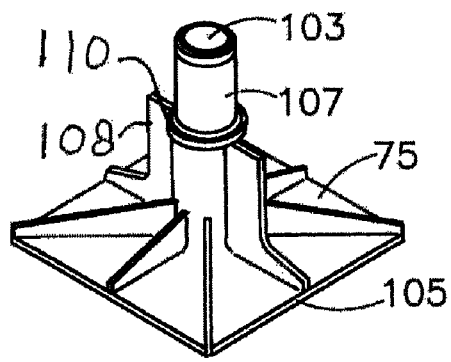
FIGS. 10a to 10b schematically show a pressure plate according to an embodiment.
Figure 10B:
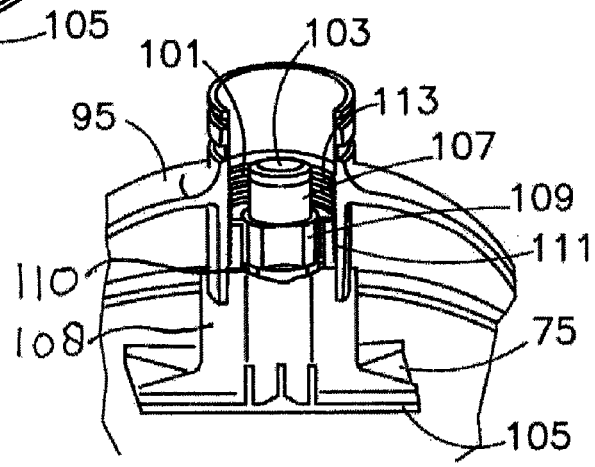
Figure 11A:
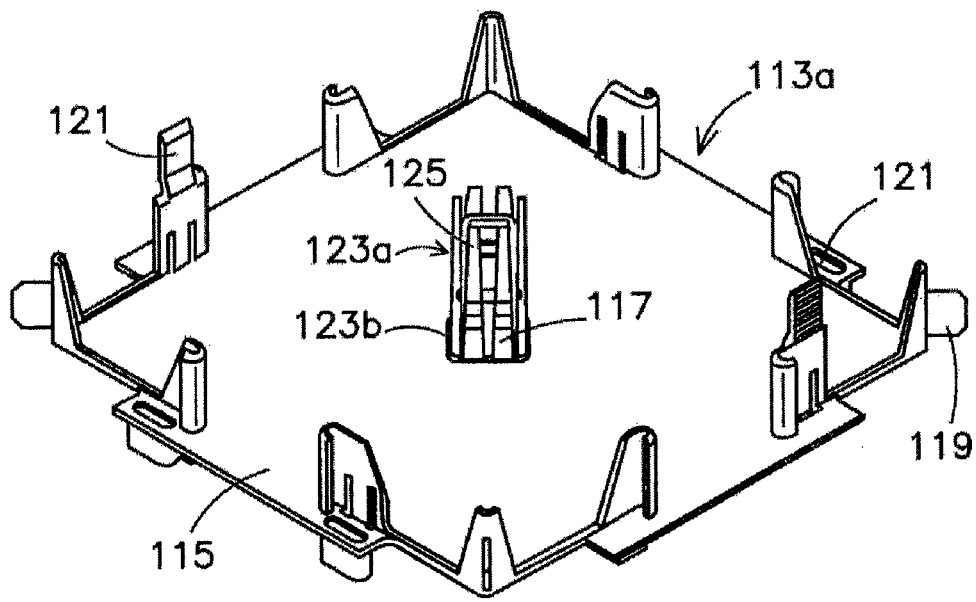
FIGS. 11a to 11d schematically show a top view of a tray 113a for use in an embodiment.
Figure 11B:
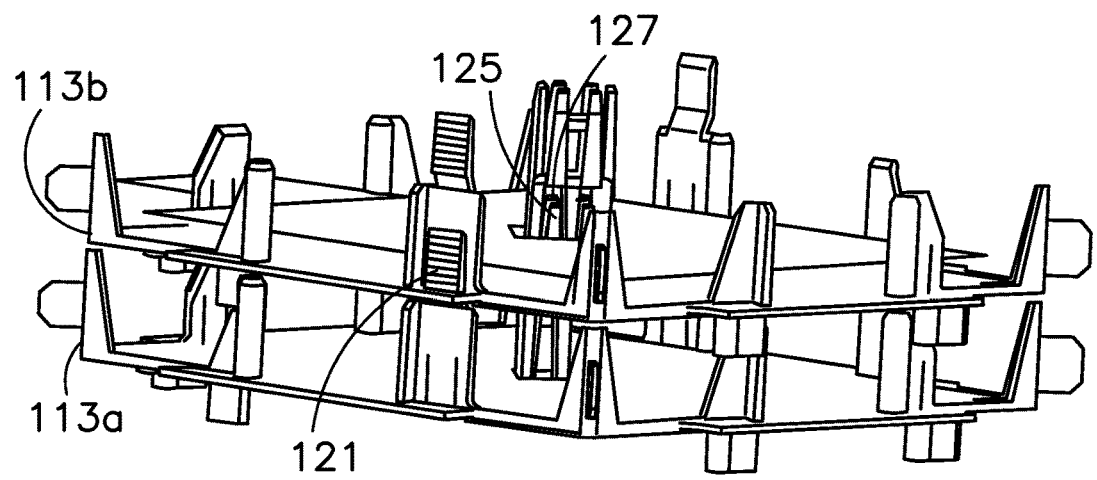
Figure 11C:
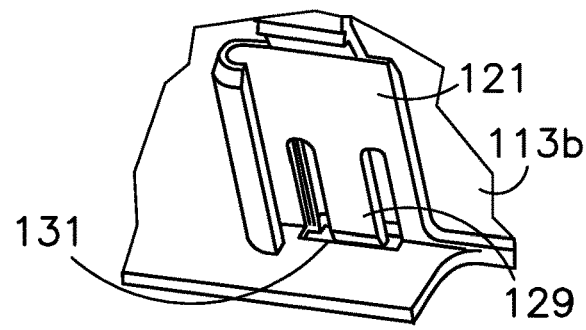
Figure 11D:
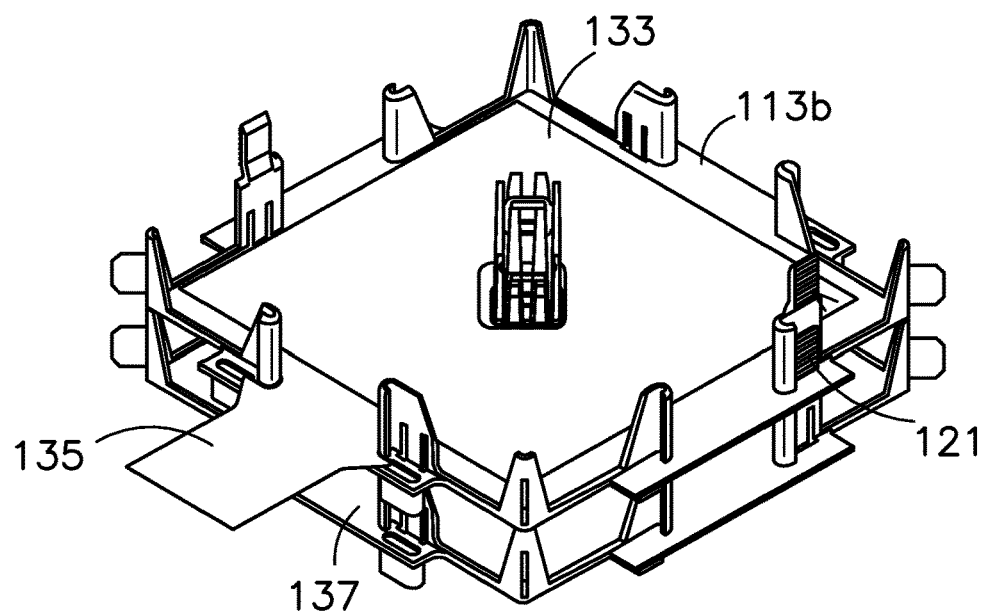

FIG. 10a schematically depicts a pressure plate 75 according to an embodiment. The pressure plate 75 has a base 105 and a top portion 107. The top portion has an opening 103 to allow water to exit the stack(s). FIG. 10b schematically depicts how the pressure plate 75 of FIG. 10a may be used to compress the capacitive electrode stacks together. A compression member, for example a nut like object 109 may be accessed through the dome opening 101 to be tightened by rotating the nut like object with respect to the top dome 95. The nut like object 109 may be provided with an external thread 111 to cooperate with an internal thread 113 of the top dome 95. By rotating the nut like object 109 the capacitive electrode stacks may be compressed between the bottom plate 73 and the pressure plate 75. The nut like object 109 may comprise holes to allow water to pass through and to provide grip to rotate the nut like object 109. In the center of the nut like object 109, there is a hole in which the top portion 107 of the pressure plate 75 rotatably fits.

The pressure plate 105 may have an interface between the housing and the pressure plate to inhibit a rotation of the pressure plate 105 relative to the housing. The interface may have a projection extending from the pressure plate or the housing and a receiver formed in the other of the pressure plate or the housing to inhibit a rotation. The top portion may define an annular lip 110 and the compression member may define an end face. The end face of the compression member may engage the annular lip 110 of the top portion to compress the stack.

Before compressing the pressure plate on the capacitive electrode stacks, water may be flushed through the spacer along the electrodes to hydrate the stack. Hydrating and/or flushing helps to remove any loose material out of the spacer, after which the capacitive electrode stack will be compressed. It is advantageous that the dome opening 101 in the top dome 95 allows for the compression to take place because the capacitive electrode stack(s) may be compressed after the housing has been filled with water. Also during maintenance the compression may be adjusted via the dome opening 101. The top dome 95 which is dome shaped may include a neck that extends into the interior. Internal threads may be formed on an interior surface of the neck; and external threads may be formed on an exterior surface of the compression member. The internal threads and the external threads are configured to engage, such that rotation of the compression member around the longitudinal axis may move the compression member along a longitudinal axis of the housing. A longitudinal slit, receiver or a slot may be formed in the neck and a radial tab 108 may extend from the top portion 107 wherein the longitudinal slit and the radial tab are configured to interface, such that rotation of the pressure plate 75 relative to the housing is inhibited.

FIG. 11 a schematically shows a top view of a tray 113a for use in an embodiment. The tray 113a may comprise a main surface 115 to receive a capacitive electrode stack. The tray 113a may have an opening 117 as an alignment feature, which may be used to slide the tray along the rod 77 (see FIG. 7) and to provide water to, or remove water from, the interior of the capacitive electrode stack. The opening 117 may be constructed and arranged to cooperate with the rod 77, for example the size of the opening and the rod 77 may substantially match. The tray 113a may have additional alignment features for alignment with the capacitive electrode stack, the rod, the housing, and/or other trays. Alignment features, such as protrusion 119, may be used to align the tray 113a with the housing, or keep it at a constant distance from the housing. Another example of an alignment features may be tab 121 provided with teeth and provided to the first tray 113a to interlock the tray with a second tray positioned on top of the first tray 113a. Surrounding the opening 117 there may be provided as alignment features first and second pillar structure 123a and 123b respectively; both pillar structures may be provided with pillars and holes. The pillars 125 of the first pillar structure 123a may align with the holes 127 of a second pillar structure provided to a second tray 113b (see FIG. 11b). The tabs 121 with teeth of the first tray 113a may protrude through an opening in the second tray 113b and the teeth of the first tray may interlock with an edge of the opening of the second tray 113b. A spring 129 (see FIG. 11c) may be provided to the tab 121 of the second tray 113b to press the teeth (not shown) against the edge 131. FIG. 11d shows how the teeth of the tab 121 interlock with second tray 113b.

Further, a first electrode 133 is shown. The electrode comprises a first current collector 135 and is positioned within the tray and aligned by the alignment features of the second tray 113b. The first current collector 135 protrudes outside the second tray 113b so that it may be connected to other current collectors. The second tray 113b may comprise an opening 137 which may interlock with a clamp (not shown) which clamps the first current collector of the second tray 113b to the second current collector of another tray. The trays may function as an electrical insulator between capacitive electrode stacks. By interlocking a number of trays each provided with a capacitive electrode stack and by connecting the current collectors to each other the capacitive electrode stack may be assembled together.

Subsequently the capacitive electrode stacks may be put into a housing and flushed with water. After flushing the capacitive electrode stacks, the stacks may be compressed by rotating the nut like object 109 of FIG. 10 and the capacitive electrode stacks may be compressed between the bottom plate 73 and the pressure plate 75.

While specific embodiments of the invention have been described above, it will be appreciated that the invention may be practiced otherwise than as described. For example, the invention may take the form of a computer program containing one or more sequences of machine-readable instructions describing a method as disclosed above, or a data storage medium (e.g. semiconductor memory, magnetic or optical disk) having such a computer program stored therein.

Embodiments are also provided in the following numbered clauses:

1. An apparatus to remove ions comprises a plurality of capacitive electrode stacks, each capacitive electrode stack comprising:
    a first electrode comprising a first current collector;
    a second electrode comprising a second current collector; and
    a spacer between the first and second electrodes to allow water to flow in between the electrodes,
    wherein the second current collector of a first of the plurality of capacitive electrode stacks is directly connected to the first current collector of a second of the plurality of capacitive electrode stacks.
2. The apparatus according to the preceding clause, wherein the second current collector of the second of the plurality of capacitive electrode stacks is in direct electrical connection to the first current collector of a third of the plurality of capacitive electrode stacks.
3. The apparatus according to any of the preceding clauses, further comprising a housing and the apparatus comprising:
    an inlet to let water enter an interior of the housing; and
    an outlet to let water out of the interior of the housing,
    wherein the second current collector of the first of the plurality of capacitive electrode stacks is directly connected to the first current collector of the second of the plurality of capacitive electrode stacks within the same housing.
4. The apparatus according to any of the preceding clauses, wherein the first and second current collectors are directly connected by pressing them against each other.
5. The apparatus according to any of the preceding clauses, further comprising a clamp to press the current collectors against each other.
6. The apparatus according to clause 5, wherein the clamp is of a non-metal material.
7. The apparatus according to any of the preceding clauses, wherein the current collectors are metal free.
8. The apparatus according to any of the preceding clauses, wherein the current collectors comprise carbon to conduct an electrical charge.
9. The apparatus according to any of the preceding clauses, further comprising a power connector for connection with a power supply and the stacks are in connected in series with the power connector.
10. The apparatus according to clause 9, wherein the power connector is connected in series to a first current collector of a first of the plurality of capacitive electrode stacks and to a second current collector of the last of the plurality of capacitive electrode stacks.
11. The apparatus according to clause 9 or clause 10, wherein the power connector comprises a metal and a carbon portion.

12. The apparatus according to clause 11, further comprising a power connector clamp configured to press the current collector against the carbon portion of the power connector.
13. The apparatus according to any of the preceding clauses, further comprising an insulator between each capacitive electrode stack so to electrically insulate both stacks from each other.
14. The apparatus according to clause 13, wherein the insulator comprises a tray configured to hold the stack.
15. The apparatus according to clause 14, further comprising a second insulator substantially surrounding the current collector so as to electrically insulate the current collector.
16. The apparatus according to any of clauses 9 to 15, comprising a housing and the apparatus comprises:
    an inlet to let water enter an interior of the housing; and
    an outlet to let water out of the interior of the housing,
    wherein the power connector provides an electrical connection between the current collector and the outside of the housing.
17. The apparatus according to any of the preceding clauses, wherein each capacitive electrode stack comprises:
    a plurality of first electrodes comprising a plurality of first current collectors; and
    a plurality of second electrodes comprising a plurality of second current collectors,
    wherein the second current collectors of a first of the plurality of capacitive electrode stacks are directly connected to the first current collectors of a second of the plurality of capacitive stacks.
18. The apparatus according to clause 17, wherein the plurality of current collectors within the electrode stack are connected in parallel.
19. An apparatus to remove ions comprising:
    a plurality of capacitive electrode stacks, each electrode capacitive electrode stack comprising:
        a first electrode comprising a first current collector,
        a second electrode comprising a second current collector, and
        a spacer between the first and second electrodes to allow water to flow in between the electrodes; and
    a power connector configured to connect a power source to a plurality of the capacitive electrode stacks in electrical serial connection with each other,
    wherein the resistivity in each of the capacitive electrode stacks is substantially equal so as to divide the potential difference of the power source substantially equally over all capacitive electrode stacks.
20. The apparatus according to clause 19, further comprising a housing and the apparatus comprising:
    an inlet to let water enter an interior of the housing; and
    an outlet to let water out of the interior of the housing,
    wherein the capacitive electrode stacks are serially connected within the housing.
21. The apparatus according to clause 19 or clause 20, wherein the electrical current going through the second electrode of the first capacitive electrode stack is equal to the electrical current going into the first electrode of the second capacitive electrode stack.
22. The apparatus according to any of clauses 19 to 21, wherein the capacitive electrode stacks that are in electrical serial connection with each other are placed in a same housing.
23. The apparatus according to any of clauses 19 to 22, wherein the second current collector of the first of the plurality of capacitive electrode stacks is directly connected to the first current collector of the second of the plurality of capacitive electrode stacks.
24. The apparatus according to any of clauses 19 to 23, further comprising a pressure device configured to provide a pressure to the stacks such that the pressure for each of the stack is equal.
25. A method for manufacturing an apparatus to remove ions, the method comprising:
    providing a plurality of capacitive electrode stacks, each capacitive electrode stack manufactured by:
        providing a first electrode comprising a first current collector;
        providing a second electrode comprising a second current collector; and
        providing a spacer between the first and second electrodes to allow water to flow in between the electrodes,
    connecting the second current collector of a first of the plurality of capacitive electrode stacks to the first current collector of a second of the plurality of capacitive electrode stacks.
26. An apparatus to remove ions, the apparatus comprising a housing and the apparatus comprising:
    an inlet to let water enter an interior of the housing;
    an outlet to let water out of the interior of the housing;
    a first electrode comprising a current collector;
    a second electrode;
    a spacer to separate the electrodes and allow water to flow in between the electrodes; and
    a connector to connect the current collector inside the housing with an electrical source outside the housing,
    wherein the connector comprises a closing off portion configured to close an opening in the housing and to form a boundary for the water in the housing.
27. The apparatus according to clause 26, wherein the current collector is pressed against a substantially flat surface of the connector.
28. The apparatus according to clause 26 or clause 27, wherein the connector is pressed against the housing.
29. The apparatus according to any of clauses 26 to 28, further comprising a flexible material between the connector and the opening so as to close the opening off in a water tight manner.
30. The apparatus according to any of clauses 26 to 29, wherein the closing off portion is made from a material comprising carbon.
31. The apparatus according to clause 30, wherein the material comprises graphite.
32. The apparatus according to clause 30, wherein the material comprises a conductive polymer.
33. The apparatus according to any of clauses 26 to 32, wherein the connector comprises a metal portion connecting to a connector portion at a dry surface of the connector portion.
34. The apparatus according to clause 33, wherein the connector portion comprises a hole in the dry surface and the metal portion enters the connector portion through the hole.
35. The apparatus according to any of clauses 26 to 34, further comprising a clamp to press the electrode against the closing off portion of the connector.
36. The apparatus according to clause 35, wherein the clamp comprises a stationary part and a moveable part and the moveable part is moveable against the electrode to press the electrode against the closing off portion of the connector.
37. The apparatus according to clause 36, wherein the moveable and stationary parts of the clamp are constructed and arranged so that the moveable part is moveable in a first direction but blocked in an opposite direction.

38. A capacitive deionization device, comprising:
a housing defining an opening between an interior of the housing and an exterior of the housing;
a stack within the housing;
a contact member seated in the opening and defining a contact portion adjacent to the interior of the housing and a connector portion adjacent to the exterior of the housing; and
a lead engaged with the connector portion and capable of directing an electrical current to the contact member,
wherein the contact portion is configured to engage the stack such that the contact member is in electrical communication with the stack.

39. The capacitive deionization device of clause 38, wherein the contact portion is substantially cylindrical and defines a contact face, and a perimeter of the contact face forms an arcuate rim.

40. The capacitive deionization device of clause 38, wherein:
the contact portion defines a contact face having a rim about a perimeter of the contact face; and
the contact face includes a recess inward of the perimeter, and a protrusion extending from the recess that terminates substantially coplanar with the rim.

41. The capacitive deionization device of clause 40, wherein the contact face is substantially circular and the protrusion is substantially cylindrical.

42. The capacitive deionization device of clause 38, wherein the connector portion is substantially cylindrical and a receptacle is formed in the connector portion such that the lead is engaged within the receptacle.

43. The capacitive deionization device of clause 38, wherein the housing further defines a recess proximate the opening and the contact portion of the contact member is seated in the recess.

44. The capacitive deionization device of clause 38, wherein the contact member is press fit in the opening and/or adhered in the opening.

45. The capacitive deionization device of clause 38, further comprising a seal formed between the contact member and the opening such that a fluid within the interior of the housing is inhibited from flowing through the opening toward the exterior of the housing.

46. The capacitive deionization device of clause 45, wherein the seal includes an O-ring seated in an annular channel formed in a radial face of the contact portion.

47. The capacitive deionization device of clause 38, further comprising:
a plurality of electrodes within the stack;
a protrusion member extending from an interior surface of the housing; and
a compression member configured to selectively engage the protrusion member at a plurality of positions relative to the contact member such that the compression member may be adjusted to compress the plurality of electrodes between the compression member and the contact portion of the contact member.

48. The capacitive deionization device of clause 47, wherein:
the protrusion member includes a pair or arms;
the compression member includes a bridge spanning between the pair or arms; and
the bridge is moveable along the pair of arms to adjust a pressure applied to the plurality of electrodes between the bridge and the contact portion.

49. The capacitive deionization device of clause 38, wherein:
the stack includes an electrode having an electrode plane;
the contact portion defines a contact face having a contact plane; and
the electrode plane and the contact plane are substantially parallel.

50. The capacitive deionization device of clause 38, wherein:
the opening defines an elbow passage having a first portion extending substantially perpendicular to a longitudinal axis of the housing and a second portion extending substantially parallel to the longitudinal axis; and
the contact member is seated in the second portion.

51. The capacitive deionization device of clause 38, wherein the contact member is at least partially formed of graphite.

52. An electrical connector assembly, comprising:
a base member;
a contact member seated in the base member and defining a contact portion and a connector portion extending from the contact portion;
a lead engaged with the connector portion and capable of directing an electrical current to the contact member;
a protrusion member extending from the base member adjacent to the contact member; and
a compression member configured to selectively engage the protrusion member at a plurality of positions relative to the contact member such that the compression member may be adjusted to compress an electrode between the compression member and the contact member.

53. The electrical connector assembly of clause 52, wherein:
the contact portion is substantially cylindrical and defines a contact face; and
a perimeter of the contact face forms an arcuate rim.

54. The electrical connector assembly of clause 52, wherein:
the contact portion defines a contact face having a rim about a perimeter of the contact face; and
the contact face includes a recess inward of the perimeter, and a protrusion extending from the recess that terminates substantially coplanar with the rim.

55. The electrical connector assembly of clause 54, wherein:
the contact face is substantially circular; and
the protrusion is substantially cylindrical.

56. The electrical connector assembly of clause 52, wherein:
the connector portion is substantially cylindrical; and
a receptacle is formed in the connector portion such that the lead is engaged within the receptacle.

57. The electrical connector assembly of clause 52, wherein:
the base member defines a recess; and
the contact portion of the contact member is seated in the recess.

58. The electrical connector assembly of clause 57, wherein the contact member is press fit in the recess and/or adhered in the recess.

59. The electrical connector assembly of clause 57, further comprising a seal formed between the contact member and the recess such that a fluid is inhibited from flowing past the seal.

60. The electrical connector assembly of clause 59, wherein the seal includes an 0-ring seated in an annular channel formed in a radial face of the contact portion.

61. The electrical connector assembly of clause 52, wherein:
the protrusion member includes a pair of arms;

the compression member includes a bridge spanning between the pair of arms; and the bridge is moveable along the pair of arms to adjust a pressure applied to the electrode between the bridge and the contact portion of the contact member.

62. The electrical connector assembly of clause 52, wherein:
    the compression member includes a resilient arm having a first interlocking member; and
    the protrusion member includes a second interlocking member;
    wherein the first interlocking member and the second interlocking member are configured to selectively engage such that first interlocking member of the compression member may be restrained relative to the contact member by the second interlocking member of the protrusion member.

63. The electrical connector assembly of clause 62, wherein:
    the first interlocking member defines a plurality of ramps;
    the second interlocking member defines a plurality of inverse ramps;
    the plurality of ramps and the plurality of inverse ramps engage to inhibit separation of the protrusion member and the compression member.

64. The electrical connector assembly of clause 52, wherein:
    the contact portion defines a contact plane;
    the compression member defines a compression plane; and
    the contact plane and the compression plane are substantially parallel.

65. The electrical connector assembly of clause 52, wherein:
    the base member includes an opening that defines an elbow passage having a first portion extending substantially perpendicular to a wall of the base member and a second portion extending substantially parallel to the wall; and
    the contact member is seated in the second portion.

66. The electrical connector assembly of clause 52, wherein the contact member is at least partially formed of graphite.

67. An electrical connector, comprising:
    a contact portion having a head that defines a contact face;
    a connector portion having a neck extending from the head in a direction away from the contact face;
    a lead engaged with the neck and capable of directing an electrical current to the head; and
    a seal portion defined by the head and/or the neck such that the seal portion establishes
    a hydraulic seal between the seal portion and a mount into which the electrical connector is seated during operation.

68. The electrical connector of clause 67, wherein:
    the head is substantially cylindrical; and
    the neck is substantially cylindrical.

69. The electrical connector of clause 67, wherein a perimeter of the contact face forms an arcuate rim.

70. The electrical connector of clause 67, wherein the contact face further comprises:
    a rim about a perimeter of the contact face;
    a recess inward of the perimeter; and
    a protrusion extending from the recess that terminates substantially coplanar with the rim.

71. The electrical connector of clause 70, wherein:
    the contact face is substantially circular; and
    the protrusion is substantially cylindrical.

72. The electrical connector of clause 67, wherein:
    the connector portion is substantially cylindrical; and
    a receptacle is formed in the neck such that the lead is engaged within the receptacle.

73. The electrical connector of clause 67, wherein the seal portion is defined by the head.

74. The electrical connector of clause 73, wherein the seal portion includes:
    an annular channel formed in a radial face of the head; and
    an O-ring seated in the annular channel.

75. The electrical connector of clause 67, wherein the head defines an annular mounting face opposite to the contact face.

76. The electrical connector of clause 67, wherein the contact portion is at least partially formed of graphite.

77. The electrical connector of clause 76, wherein the connector portion is at least partially formed of graphite.

78. The electrical connector of clause 67, wherein the contact portion and the connector portion are integral.

79. A capacitive deionization device, comprising:
    a housing defining an opening;
    a stack within the housing;
    a pressure plate within the housing and adjacent to the stack; and
    a compression member within the opening and adjacent to the pressure plate,
    wherein the compression member engages the housing and the pressure plate such that moving the compression member relative to the housing urges the pressure plate toward the stack to compress the stack.

80. The capacitive deionization device of clause 79, further comprising:
    a first fluid passage formed through the compression member and in fluid communication with the opening; and
    a second fluid passage formed through the pressure plate and in fluid communication with the opening.

81. The capacitive deionization device of clause 79, further comprising an interface between the housing and the pressure plate that inhibits rotation of the pressure plate relative to the housing.

82. The capacitive deionization device of clause 81, wherein the interface comprises:
    a projection extending from the pressure plate or the housing; and
    a receiver formed in the other of the pressure plate or the housing.

83. The capacitive deionization device of clause 79, further comprising:
    internal threads formed on an interior surface of the opening; and
    external threads formed on an exterior surface of the compression member,
    wherein the internal threads and the external threads are configured to engage, such that rotation of the compression member relative to the housing moves the compression member along an axis of the housing.

84. The capacitive deionization device of clause 79, wherein rotating the compression member relative to the housing adjusts the compression member to alter a position of the pressure plate.

85. The capacitive deionization device of clause 79, wherein the stack comprises a plurality of stacks.

86. A capacitive deionization device, comprising:
    a housing, the housing including:
    a first end; and
    a second end opposite to the first end;
    a stack arranged within the housing, the stack including:
    a first electrode;
    an anion member adjacent to the first electrode;
    a second electrode;
    a cation member adjacent to the second electrode; and
    a spacer between the anion member and the cation member;

a pressure plate adjacent to the stack, the pressure plate including:
a base; and
a top portion extending from the base; and
a compression member proximate to the pressure plate and the housing,
wherein the compression member engages the top portion of the pressure plate and the first end of the housing, such that the compression member may be adjusted to alter a position of the pressure plate relative to the first end of the housing to compress the stack toward the second end of the housing.

87. The capacitive deionization device of clause 86, wherein rotating the compression member relative to the housing adjusts the compression member to alter the position of the pressure plate relative to the first end of the housing.

88. The capacitive deionization device of clause 86, wherein:
the housing defines internal threads; and
the compression member defines external threads configured to threadably engage the internal threads of the housing.

89. The capacitive deionization device of clause 86, wherein:
the top portion defines an annular lip;
the compression member defines an end face; and
the end face of the compression member engages the annular lip of the top portion to compress the stack toward the second end of the housing when the compression member is adjusted.

90. The capacitive deionization device of clause 86, further comprising:
an opening formed through the first end of the housing;
a first fluid passage formed through the compression member and in fluid communication with the opening; and
a second fluid passage formed though the pressure plate, and in fluid communication with the opening,
wherein the first fluid passage defines a fluid inlet directing untreated fluid into the housing; and
wherein the second fluid passage defines a fluid outlet directing treated water from the housing.

91. The capacitive deionization device of clause 86, further comprising an interface between the housing and the pressure plate, such that the interface inhibits rotation of the pressure plate relative to the housing.

92. The capacitive deionization device of clause 91, wherein the interface comprises:
a projection extending from the top portion of the pressure plate; and
a receiver formed in the first end of the housing.

93. The capacitive deionization device of clause 86, further comprising an interior defined between the first end and the second end of the housing, wherein the first end is dome-shaped and includes a neck that extends into the interior.

94. The capacitive deionization device of clause 93, further comprising:
internal threads formed on an interior surface of the neck; and
external threads formed on an exterior surface of the compression member,
wherein the internal threads and the external threads are configured to engage, such that rotation of the compression member moves the compression member along a longitudinal axis of the housing.

95. The capacitive deionization device of clause 94, further comprising:
a longitudinal slit formed in the neck; and
a radial tab extending from the top portion,
wherein the longitudinal slit and the radial tab are configured to interface, such that rotation of the pressure plate relative to the housing is inhibited.

96. The capacitive deionization device of clause 86, wherein the stack comprises a plurality of stacks.

97. A capacitive deionization device, comprising:
a housing defining a longitudinal axis;
a stack within the housing;
a pressure plate within the housing and adjacent to the stack;
a compression member engaged with the housing and adjacent to the pressure plate, such that movement of the compression member relative to the housing urges the pressure plate along the longitudinal axis toward the stack; and
an interface between the housing and the pressure plate that inhibits rotation of the pressure plate relative to the housing.

98. The capacitive deionization device of clause 97, wherein the interface comprises:
a projection extending from the pressure plate or the housing; and
a receiver formed in the other of the pressure plate or the housing.

99. The capacitive deionization device of clause 97, wherein the interface comprises:
a tab radially extending from the pressure plate; and
a slot formed in the housing,
wherein the tab is sized to seat within the slot, such that the pressure plate is inhibited from rotation relative to the housing as the tab of the pressure plate abuts the slot of the housing.

100. The capacitive deionization device of clause 97, wherein:
the housing defines internal threads;
the compression member defines external threads configured to threadably engage the internal threads of the housing; and
rotation of the compression member urges the pressure plate along the longitudinal axis toward the stack.

101. The capacitive deionization device of clause 100, wherein:
the compression member rotates about the longitudinal axis; and
the compression member directly engages the pressure plate.

102. The capacitive deionization device of clause 97, further comprising:
an opening formed through the housing;
a first fluid passage formed through the compression member and in fluid communication with the opening; and
a second fluid passage formed through the pressure plate and in fluid communication with the opening.

103. The capacitive deionization device of clause 102, wherein the opening and the second fluid passage are concentric and axially aligned with the longitudinal axis.

104. The capacitive deionization device of clause 97, wherein rotating the compression member relative to the housing adjusts the compression member to alter a position of the pressure plate.

105. A capacitive deionization device, comprising:
 a housing defining an opening between an interior of the housing and an exterior of the housing;
 a stack within the housing;
 a pressure plate within the housing and adjacent to the stack;
 a compression member engaged with the housing and adjacent to the pressure plate;
 a first fluid passage formed through the compression member and extending into the opening of the housing; and
 a second fluid passage formed through the pressure plate and extending into the opening of the housing,
 wherein moving the compression member relative to the housing urges the pressure plate toward the stack to compress the stack;
 wherein the first fluid passage defines a fluid inlet directing untreated fluid from the exterior to the interior of the housing or a fluid outlet directing treated water from the interior to the exterior of the housing, and
 wherein the second fluid passage defines the other of the fluid inlet or the fluid outlet.

106. The capacitive deionization device of clause 105, further comprising:
 internal threads formed on an interior surface of the opening; and
 external threads formed on an exterior surface of the compression member,
 wherein the internal threads and the external threads are configured to engage, such that rotation of the compression member urges the pressure plate toward the stack.

107. The capacitive deionization device of clause 105, wherein rotating the compression member relative to the housing adjusts the compression member to alter a position of the pressure plate.

108. The capacitive deionization device of clause 105, wherein the opening and the second fluid passage are concentric.

109. The capacitive deionization device of clause 105, further comprising an interface between the housing and the pressure plate that inhibits rotation of the pressure plate relative to the housing.

110. The capacitive deionization device of clause 109, wherein the interface comprises:
 a projection extending from the pressure plate or the housing; and
 a receiver formed in the other of the pressure plate or the housing.

111. The capacitive deionization device of clause 105, wherein:
 the compression member is cylindrical, and defines an interior surface and an exterior surface; and
 the first fluid passage comprises a plurality of fluid passages radially spaced about the compression member and formed between the interior surface and the exterior surface.

112. The capacitive deionization device of clause 111, wherein the exterior surface of the compression member defines external threads that are configured to engage internal threads formed on an interior surface of the opening.

113. A method of using a capacitive deionization device, the method comprising:
 providing a housing defining an opening between an interior of the housing and an exterior of the housing;
 positioning a stack in the interior of the housing;
 orienting a pressure plate in the interior of the housing and adjacent to the stack;
 engaging a compression member with the housing and the pressure plate;
 adjusting the compression member relative to the housing to urge the pressure plate toward the stack to compress the stack with the pressure plate; and
 hydrating the stack by directing fluid through the opening.

114. The method of clause 113, wherein the compression member is adjusted after hydrating the stack.

115. The method of clause 113, wherein adjusting the compression member increases a pressure applied to the stack by the pressure plate.

116. The method of clause 113, further comprising a first fluid passage formed through the compression member, wherein hydrating the stack includes directing the fluid into the first passage.

117. A method of producing an apparatus to remove ions from water, the method comprising:
 providing a first electrode;
 providing a spacer against the first electrode;
 providing a second electrode against the spacer; and
 flushing water through the spacer and subsequently exerting a force on the stack so as to compress the first and second electrodes and the spacer.

118. The method according to clause 117, wherein the steps of:
 providing a first electrode;
 providing a spacer against the first electrode;
 providing a second electrode against the spacer; and
 providing a spacer against the second electrode, are repeated multiple times.

119. The method according to clause 117 or clause 118, wherein exerting a force results in a pressure of less than 5 bar, less than 2 bar, or between 1 bar and 0.5 bar, between the electrodes and the spacer.

120. The method according to any of clauses 117 to 119, further comprising providing a tray to hold the electrodes and the spacer.

121. The method according to any of clauses 117 to 120, further comprising aligning the electrodes and the spacer with each other.

122. The method according to any of clauses 117 to 121, wherein flushing water through the spacer comprises flushing with a pressure of between 0.5 and 10 bar, between 1 and 5 bar or between 2 and 4 bar.

123. The method according to any of clauses 117 to 122, further comprising providing the electrodes and the spacer in a housing, the housing comprising an inlet and an outlet opening, and providing water to the housing via the inlet opening for flushing water through the spacer.

124. The method according to any of clauses 117 to 123, wherein exerting a force so as to compress the first and second electrodes and the spacer comprises providing a first pressure plate against one side of a stack formed by the electrodes and the spacer and a second pressure plate against the other side of the stack, providing a rod through all the electrodes and spacers and exerting a force on the first and second pressure plates via the rod to compress the stack in between the plates.

125. The method according to any of clauses 117 to 124, wherein the first and second electrodes comprise current collectors and some current collectors may be connected together before compressing the first and second electrodes and the spacer.

The descriptions above are intended to be illustrative, not limiting. Thus, it will be apparent to one skilled in the art that modifications may be made to the invention as described without departing from the scope of the claims set out below.

The invention claimed is:

1. An apparatus to remove ions, the apparatus comprising:
a plurality of capacitive electrode stacks, each capacitive electrode stack comprising:
a first electrode comprising a first current collector,
a second electrode comprising a second current collector, and
a spacer between the first and second electrodes to allow water to flow in between the electrodes;
a clamp to press and hold the second current collector of a first of the plurality of capacitive electrode stacks in direct physical contact against the first current collector of a second of the plurality of capacitive electrode stacks to electrically connect the second current collector of the first capacitive electrode stack with the first current collector of the second capacitive electrode stack, wherein the second current collector of the first capacitive electrode stack is electrically connected in series to the first current collector of the second capacitive electrode stack; and
a movable tray configured to hold the first electrode, the second electrode and the spacer of at least one capacitive electrode stack of the plurality of capacitive electrode stacks, wherein the tray comprises an integrated alignment feature to align the tray with another tray in the apparatus.

2. The apparatus according to claim 1, wherein the second current collector of the second capacitive electrode stack is electrically connected to a first current collector of a third capacitive electrode stack.

3. The apparatus according to claim 1, further comprising:
a housing;
an inlet to let water enter an interior of the housing;
an outlet to let water out of the interior of the housing,
wherein the second current collector of the first capacitive electrode stack is electrically connected to the first current collector of the second capacitive electrode stack within the same housing.

4. The apparatus according to claim 1, wherein the clamp is of a non metal material.

5. The apparatus according to claim 1, further comprising an insulator substantially surrounding the first and second current collectors so as to electrically insulate the first and second current collectors.

6. The apparatus according to claim 1, wherein an insulator is located between adjacent capacitive electrode stacks in order to electrically insulate the adjacent capacitive electrode stacks from each other.

7. The apparatus according to claim 1, wherein the tray has a protruding portion to physically engage with the first electrode, the second electrode or the spacer.

8. The apparatus according to claim 1, wherein flow paths of the liquid through the plurality of capacitive electrode stacks each have a direction component that is parallel with each other.

9. The apparatus according to claim 1, wherein the tray comprises an alignment feature at a central portion of the tray to cooperate with a structure of the apparatus to prevent or limit horizontal shifting of the tray.

10. The apparatus according to claim 1, further comprising a power connector for connection with a power supply and the capacitive electrode stacks are connected in series with the power connector.

11. The apparatus according to claim 10, wherein the power connector is connected in series with the first current collector of the first capacitive electrode stack and with the second current collector of a last of the plurality of capacitive electrode stacks.

12. The apparatus according to claim 10, further comprising:
a housing;
an inlet to let water enter an interior of the housing;
an outlet to let water out of the interior of the housing,
wherein the power connector provides an electrical connection between a first or second current collector and the power source outside of the housing.

13. The apparatus according to claim 10, wherein the power connector comprises a metal and a carbon portion.

14. The apparatus according to claim 13, further comprising a power connector clamp configured to press a first or second current collector against the carbon portion of the power connector.

15. A method for manufacturing an apparatus to remove ions, the method comprising:
providing a plurality of capacitive electrode stacks, each capacitive electrode stack manufactured by:
providing a first electrode comprising a first current collector,
providing a second electrode comprising a second current collector, and
providing a spacer between the first and second electrodes to allow water to flow in between the electrodes;
using a clamp to press and hold the second current collector of a first of the plurality of capacitive electrode stacks in direct physical contact against the first current collector of a second of the plurality of capacitive electrode stacks to electrically connect the second current collector of the first capacitive electrode stack with the first current collector of the second capacitive electrode stack, wherein the second current collector of the first capacitive electrode stack is electrically connected in series to the first current collector of the second capacitive electrode stack; and
using a movable tray to hold the first and second electrodes and the spacer of at least one capacitive electrode stack of the plurality of capacitive electrode stacks, wherein the tray comprises an integrated alignment feature to align the tray with another tray in the apparatus and/or comprises an alignment feature at a central portion of the tray to cooperate with a structure of the apparatus to prevent or limit horizontal shifting of the tray.

16. The method of claim 15, further comprising electrically connecting the second current collector of the second capacitive electrode stack to a first current collector of a third capacitive electrode stack.

17. An apparatus to remove ions, the apparatus comprising:
a plurality of capacitive electrode stacks, each capacitive electrode stack comprising:
a first electrode comprising a first current collector, a second electrode comprising a second current collector,
a spacer between the first and second electrodes to allow water to flow in between the electrodes, and
a movable tray configured to hold the first and second electrodes and the spacer, the tray having a protruding portion to physically engage with the first electrode, the second electrode or the spacer and the tray comprising an alignment feature at a central portion of the tray to cooperate with a structure of the apparatus to prevent or limit horizontal shifting of the tray, wherein the second current collector of a first of the plurality of capacitive electrode stacks is electrically connected in series to the first current collector of a second of the plurality of capacitive electrode stacks.

18. The apparatus according to claim 17, wherein the tray is made up of at least an electrically insulating material.

19. The apparatus according to claim 17, wherein the tray comprises an integrated alignment feature to align the tray with another tray in the apparatus.

20. The apparatus according to claim 17, further comprising an insulator substantially surrounding the first and second current collectors so as to electrically insulate the first and second current collectors.

21. The apparatus according to claim 17, wherein flow paths of the liquid through the plurality of capacitive electrode stacks each have a direction component that is parallel with each other.

* * * * *